United States Patent
Isomura

(10) Patent No.: US 6,917,670 B2
(45) Date of Patent: Jul. 12, 2005

(54) TELEPHONE WITH ELECTRONIC MAIL MANAGEMENT FUNCTION, ELECTRONIC MAIL MANAGEMENT METHOD, AND STORAGE MEDIUM STORING ELECTRONIC MAIL MANAGEMENT PROGRAM

(75) Inventor: Hiroshi Isomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/141,318

(22) Filed: Aug. 27, 1998

(65) Prior Publication Data

US 2001/0012341 A1 Aug. 9, 2001

(30) Foreign Application Priority Data

Mar. 3, 1998 (JP) .......................................... 10-051137

(51) Int. Cl.⁷ ............................................. H04M 11/00
(52) U.S. Cl. ............................ 379/93.24; 379/100.08; 379/100.09; 358/402; 358/407
(58) Field of Search ........................... 379/90.01, 93.02, 379/93.05, 93.24, 100.08, 110.01, 88.11–88.15, 88.19, 88.22–88.25, 100.06; 709/204, 206, 207, 219; 455/556.1, 557, 556; 358/402, 407

(56) References Cited

U.S. PATENT DOCUMENTS

| | | | | |
|---|---|---|---|---|
| 5,224,156 A | * | 6/1993 | Fuller et al. ............ | 379/100.06 |
| 5,590,178 A | | 12/1996 | Murakami et al. ....... | 379/93.18 |
| 5,657,378 A | * | 8/1997 | Haddock et al. ......... | 379/93.24 |
| 5,757,891 A | * | 5/1998 | Wang ....................... | 379/93.24 |
| 5,781,614 A | * | 7/1998 | Brunson ................... | 379/88.14 |
| 5,790,649 A | * | 8/1998 | Hiroshige ................. | 379/93.24 |
| 5,825,854 A | * | 10/1998 | Larson et al. ............. | 379/93.24 |
| 5,832,218 A | * | 11/1998 | Gibbs et al. .............. | 379/93.24 |
| 5,848,137 A | * | 12/1998 | Hsiao ..................... | 379/100.06 |
| 5,944,786 A | * | 8/1999 | Quinn ........................ | 709/206 |
| 6,052,442 A | * | 4/2000 | Cooper et al. ........... | 379/93.24 |
| 6,092,102 A | * | 7/2000 | Wagner ..................... | 709/206 |
| 6,272,530 B1 | * | 8/2001 | Horiuchi et al. ........... | 709/206 |
| 6,320,941 B1 | * | 11/2001 | Tyroler ..................... | 379/93.24 |
| 6,351,763 B1 | * | 2/2002 | Kawanaka .................. | 709/206 |

FOREIGN PATENT DOCUMENTS

| | | | | | |
|---|---|---|---|---|---|
| JP | 61101140 A | * | 5/1986 | ........... | H04L/11/20 |
| JP | 62-188545 | | 8/1987 | | |
| JP | 64-060126 | * | 3/1989 | ........... | H04L/11/20 |
| JP | 06290121 A | * | 10/1994 | ........... | G06F/13/00 |
| JP | 7-99508 | | 4/1995 | | |
| JP | 9-18508 | | 1/1997 | | |
| JP | 09-307585 | * | 11/1997 | ........... | H04L/12/54 |
| JP | 10011376 A | * | 1/1998 | ........... | G06F/13/00 |
| JP | 11320862 A | * | 11/1999 | ........... | G06F/13/00 |

* cited by examiner

*Primary Examiner*—George Eng
(74) *Attorney, Agent, or Firm*—Staas & Halsey LLP

(57) ABSTRACT

The present invention introduces that E-mails are managed effectively without imposing a burden on a mail server. A memory is provided in a telephone, whereby an E-mail from the mail server can be down-loaded. When this telephone is accessed from plural terminal devices, the mail status is stored in order to be capable of recognizing that a E-mail is down-loaded to which terminal device. With this system, when E-mails are transmitted and received with plural terminal device, it is possible to manage E-mails integratedly by accessing not a mail server but a telephone.

29 Claims, 8 Drawing Sheets

FIG. 7

| INFORMATION NAME | DEVICE 1 | DEVICE 2 | DEVICE 3 |
|---|---|---|---|
| ELECTRONIC MAIL B | TRANSMITTED | TRANSMITTED | TRANSMITTED |
| ..... | ..... | ..... | ..... |

| DEVICE ID | PROCESS |
|---|---|
| DEVICE 1 | STORE |
| DEVICE 2 | STORE |
| DEVICE 3 | DELETE |
| ----- | ---- |

801

TELEPHONE WITH ELECTRONIC MAIL MANAGEMENT FUNCTION, ELECTRONIC MAIL MANAGEMENT METHOD, AND STORAGE MEDIUM STORING ELECTRONIC MAIL MANAGEMENT PROGRAM

BACKGROUND OF THE INVENTION

1. Field of the Invention

The present invention relates to an effective technique to be applied to management for transmission-reception of electronic mail (E-mail) in Internet or in a personal computer communication.

2. Background of the Related Art

E-mail is generally used as a communication tool for business or private use. It is general that such a E-mail is transmitted-received by using each computer connected to LAN in a company or by connecting a personal computer with a telephone line for dial-up connection to a provider for private use.

A business person, who goes out many times, uses often plural kinds of electronic information devices in order to transmit-receive E-mails in any environment for transmitting-receiving E-mail, for example, a desk-top personal computer in an office, a personal digital assistants when going out and a notebook personal computer at a home.

However, when one person uses plural electronic information devices in order to transmit-receive E-mails in this way, it is difficult to manage E-mails integratedly. Therefore, for example, there are cases in that an E-mail is down-loaded twice or more and a needed E-mail is down-loaded by another electronic information device, hereby incapable of being used.

To give further concrete explanations of this problem, a prior art is explained with reference to FIG. 1.

FIG. 1 is an explanatory view showing conventional E-mail management.

In this explanation, an user uses three terminal devices. Explanations are given of a case in that the user uses three terminal devices 101, 102, 103 and E-mails are transmitted-received via a provider server 104 and a telephone line 106.

It is assumed that the user chooses the device 101 such as a portable digital assistant carried when going out, the device 102 such as a notebook personal computer used when moving through rooms, and the device 103 such as desk-top personal computer used by fixing at a location. All of the devices are respectively provided with memories, and it is possible to store down-loaded E-mails in each of memories.

The user, when down-loading an E-mail arriving at the provider server 104, calls the provider server 104 via the telephone line 106 from one of the devices 101, 102 or 103 held at that time, and receives the E-mail by the device 101, 102 or 103 of which an address is given as a dial-up IP in the E-mail. Further, the E-mail in the provider server 104 after receiving may be deleted or stored.

It is assumed that the user, when accessing the provider server 104, down-loads an E-mail 104 in the provider server 104 with the device 101, and then deletes the E-mail 104a from the provider server 104. After this, through the user is necessary to refer or use the E-mail 104a while using the device 202, there is no information of the E-mail 104a in the memory of the device 202. In other words, the E-mail 104a exists only in the memory of the device 101, therefore, the user can not refer the E-mail 104a when not keeping the device 101 at hand.

To prevent such a case, it is necessary to remain the E-mail 104a without deleting the E-mail 104a from the provider server 104 after down-loading the E-mail 104a with one of the devices (101, 102 or 103) in order to keep a situation in that the E-mail 104a can be used again.

However, in this use style, enormous E-mail information will remain in the memory of the provider server 104, and a large quantity of already-read E-mails obstructs to receive a new E-mail. As a result, there is a possibility in that E-mail management is directly obstructed in the provider server 104.

SUMMARY OF THE INVENTION

The present invention is achieved in views of these problems, and has its object to provide a technique capable of managing E-mails effectively without imposing a burden on the provider server by an environment capable of managing E-mails integratedly even if an E-mail is deleted after being down-loaded from an provider server.

The first aspect of the present invention is a telephone with an electronic mail managing function. The telephone is capable of connecting with at least a mail server and a plurality of terminal devices, and is provided with an access unit for accessing to the mail server, a mail memory for storing an electronic mail down-loaded from the mail server through the access unit, a mail status memory for storing each status of the electronic mail stored in the mail memory unit so as to correspond to each of the terminal devices, and a transmission unit for transmitting the electronic mail stored in the mail memory to one of the terminal devices.

When one person owns several terminal devices, the telephone receives electronic mails integratedly from the mail server (a provider server). It is possible to refer and re-use unread and read mails with the terminal device by accessing the telephone. Further, since the mail status showing whether the E-mail is transmitted or not is managed for each terminal device by the mail status memory, it is possible to manage mails integratedly by referring to the mail status memory Thus, it is possible to prevent to mis-delete an electronic mail and to store unnecessary electronic mails.

The second aspect of the present invention carries out to store whether or not the electronic mail is down-loaded to each of the terminal devices in the first aspect.

With this second aspect, it is possible to know that the electronic mail is loaded to which terminal device, and it is possible to prevent to mis-delete an electronic mail certainly.

The third aspect of the present invention is provided with a process table for storing a process to be applied to the electronic mail after down-loading for each of the terminal devices in addition to the first aspect.

The process to be applied to the electronic mail after down-loading includes to delete the electronic mail and to keep the electronic mail.

For example, it may be set that an electronic mail at the telephone side is deleted when the electronic mail is down-loaded to a specified terminal device. In this way, when an terminal device finally managing electronic mails is specified, it becomes certain to manage electronic mails integratedly.

The fourth aspect of the present invention is provided with an emergency process unit for judging whether or not a priority process is necessary based on the electronic mail received from each of the terminal devices and for executing an access to the mail server when the priority process is executed in addition to the first aspect.

A flag showing a priority or the like is used, whereby it is possible to determine a priority of that the telephone deals with the electronic mail transmitted from the terminal device. Accordingly, for example, when the telephone receives an electronic mail in which an emergency process flag is set, this electronic mail is transmitted to the mail server promptly. When no priority is set in an electronic mail, this electronic mail is transmitted to the mail server from the telephone at a time for the access to the mail server, the time specified by a timer.

The fifth aspect of the present invention is provided with an identifier memory for storing an identifier of an terminal device to be connected in addition to the first aspect. In this aspect, it is permitted to access from the terminal device of which an identifier coincides with the stored identifier.

With the fifth aspect, it is possible to improve security of the telephone dealing with electronic mails.

The sixth aspect of the present invention is a mail managing method in a mail managing apparatus capable of transmitting/receiving mail data to/from at least a mail server and a plurality of terminal devices. In this method, a mail stored in the mail server is read, the read mail is stored, a status of the stored mail is displayed for each of the terminal devices, and the stored mail is transmitted to one of the terminal devices.

With this method, it is possible to manage electronic mails integratedly, and it is also possible to prevent to mis-delete electronic mails and to store unnecessary electronic mails, similarly to the first aspect.

The seventh aspect of the present invention is a storage medium storing a program used for a mail managing apparatus capable of transmitting/receiving mail data to/from at least a mail server and a plurality of terminal devices. This program includes a reading step of reading a mail stored in the mail server, a storing step of storing the mail read in the reading step, a display step of displaying a status of the mail stored in the storing step for each of the terminal devices, and a transmission step of transmitting the mail stored in the storing step to one of the terminal devices.

The seventh aspect is a storage medium storing a program carrying out the steps of the sixth aspect. As storage media, it is possible to use all types of storage media capable of storing program such as CD-ROM, CD-R, a memory card based on PCMCIA, a magnetic disk unit. When a memory card is used, a memory card storing this program is attached to a multi-function telephone, whereby it is possible to carry out a telephone with the mail managing function described in the first aspect.

BRIEF DESCRIPTION OF THE DRAWINGS

Other objects and advantages of the present invention will become apparent during the following discussion conjunction with the accompanying drawings, in which:

FIG. 7 is an explanatory view showing a mail status table in an embodiment;

FIG. 8 is an explanatory view showing a process table in an embodiment;

DETAILED DESCRIPTION OF THE PREFERRED EMBODIMENTS

Hereinafter, explanations will be given of an embodiment according to the present invention with reference to drawings.

Figure 2:
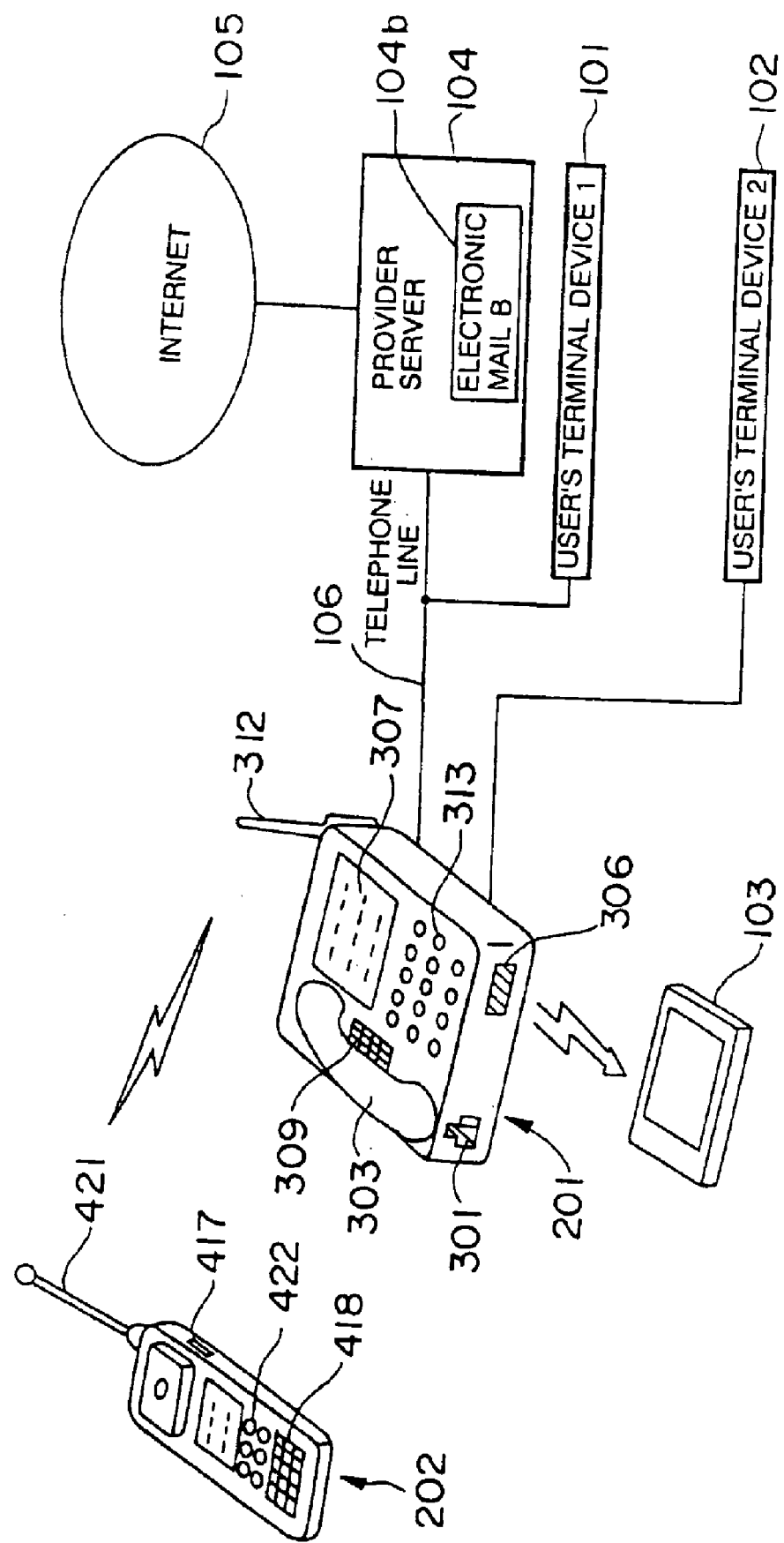
FIG. 2 is a view showing of a system configuration of an embodiment according to the present invention.

FIG. 2 shows a system configuration of an embodiment according to the present invention.

This system shown in FIG. 2 has a function in that a telephone 201 manages a E-mail 104b in the provider server 104 integratedly. A detail description will be given of this telephone 201.

Figure 1:
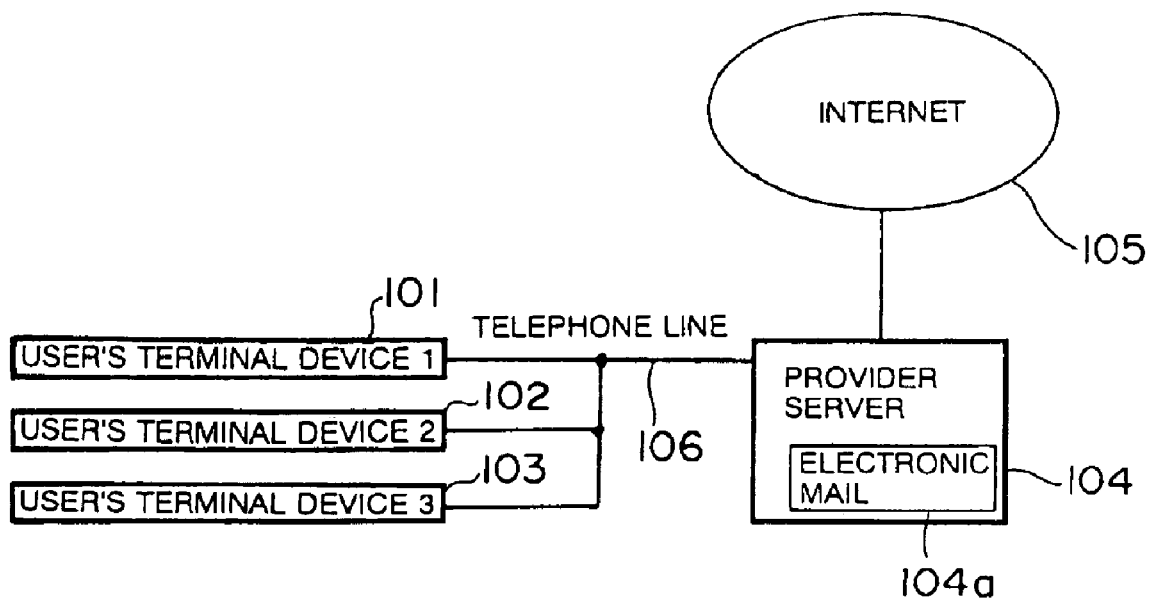
FIG. 1 is an explanatory view showing a status in that plural terminal devices access a provider server in the conventional technique.

It is assumed that one user uses three terminal devices (including electronic devices and information devices) similarly to the prior art shown in FIG. 1. The user uses the devices 101, 102 and 103, so as to transmit-receive a E-mail via the provider server 104 and the telephone line 106.

For example, it is assumed that the user chooses the device 101 such as a portable digital assistant to be carried when going out, the device 102 such as a notebook personal computer used when moving through rooms, or a device 103 such as a desk-top personal computer to be used at a fixed position. Each of these devices is provided with a memory, and it is possible to store the down-loaded E-mail in the memory.

Figure 3:
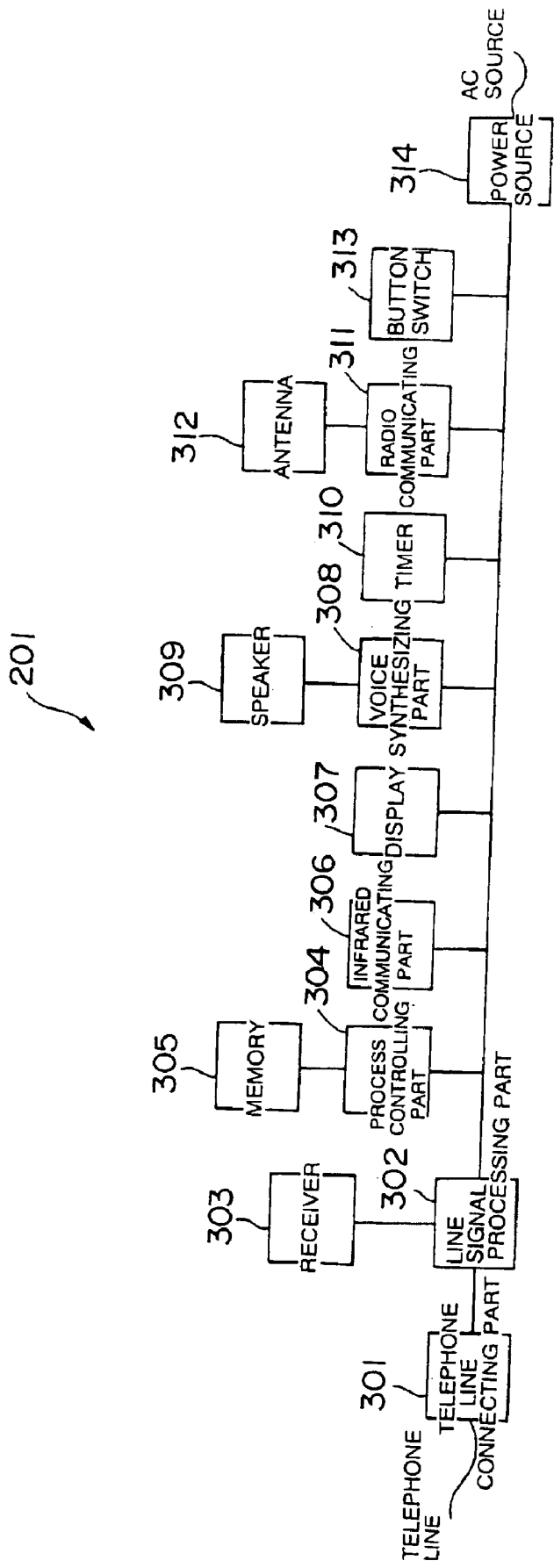
FIG. 3 is a block diagram showing a hardware configuration of a telephone in an embodiment.

Next, explanations will be given of a configuration of the telephone 201 according to this embodiment with reference to FIGS. 2 and 3.

The telephone 201 is provided with a telephone line connecting part 301, a line signal processing part 302, a receiver 303, a process controlling part 304, a memory 305, a infrared communicating part 306, a display 307, a voice synthesizing part 308, a speaker 309, a timer 310, radio communicating part 311, an antenna 312, a button switch 313, and a power source 314.

The telephone line connecting part 301 is used to connect with a connector cable of a public line (a digital line or an analog line), and is shown as a modular jack in FIG. 2.

The signal processing part 302 controls input-output of this telephone 201. The receiver 303 is shown as a hand set having an earpiece and a mouthpiece in FIG. 2. The process controlling part 304 is a CPU controlling reception of E-mail and the memory 305. The memory 305 is a nonvolatile memory, dynamic RAM or the like, and stores programs such an access program to the provider server 104, the E-mail 104b down-loaded from the provider server 104, and the like. The memory 305 can also store voice data such as a message. The memory 305 also keeps an ID of an terminal device capable of communicating with this telephone 201. The process controlling part 304 reads the ID stored in the memory 305 in order to judge whether or not the terminal device 103 communicating with the infrared communication part 306 is permitted for data communication.

Figure 5:
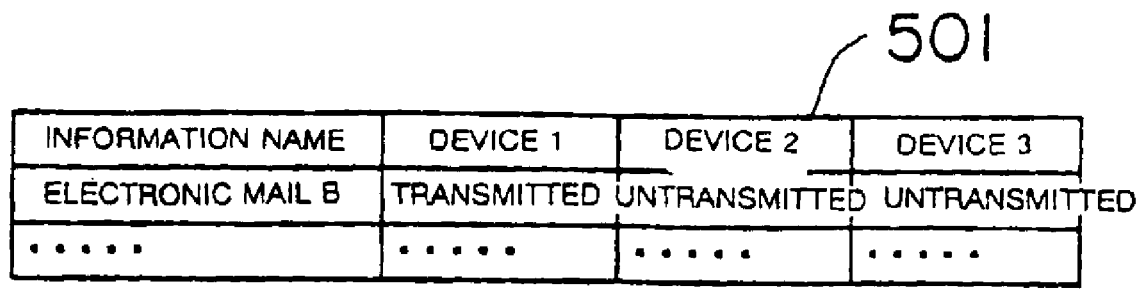
FIG. 5 is a explanatory view showing a mail status table in an embodiment.
Figure 6:
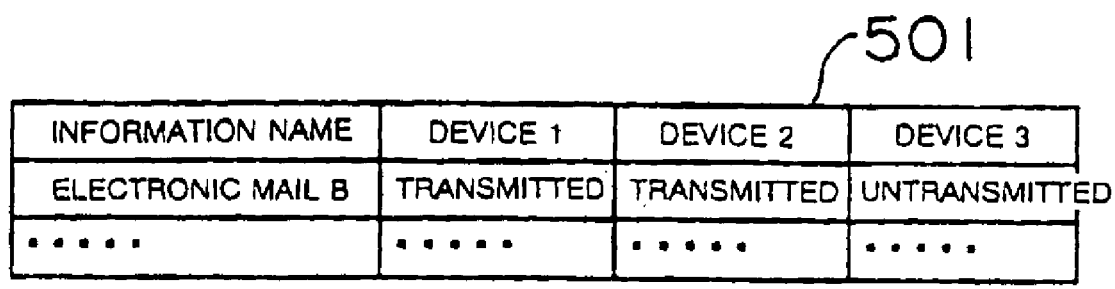
FIG. 6 is an explanatory view showing a mail status table in an embodiment.

Further, the memory 305 is provided with a mail state table 501 shown in FIGS. 5 through 7. The mail status table 501 show that the E-mail stored in the memory 305 is transmitted to which terminal device. FIG. 5 shows that the E-mail 104b is already transmitted to the terminal device 101, and is not yet transmitted to the terminal devices 102 and 103. FIG. 6 shows that the E-mail 104b is already transmitted to the terminal devices 101 and 102, and is not yet transmitted to the terminal device 103.

FIG. 7 shows that the E-mail 104b is already transmitted to all the terminal devices 101, 102 and 103.

The infrared communicating part 306 is a port communicating with the external terminal device 103 or the like. The display 307 is a liquid crystal display or the like, and displays information such as a extension number, a transmitted outside line number, and a receiving telephone number when the telephone 201 is used normally. In this embodiment, the display 307 displays that an E-mail is received from the provider server 104.

In the memory 305, a process table 801 shown in FIG. 8 is established. The process table 801 shows a process after the E-mail stored in the memory 305 of the telephone 201 is transmitted to each terminal device. In other words, it is possible to set whether or not the transmitted E-mail is stored in the memory or deleted. FIG. 8 shows a sample in that E-mail data is stored in the memory 305 when the E-mail is transmitted to the terminal devices 101 and 102 and a E-mail is deleted when the E-mail is transmitted to the terminal device 103. This is suitable to a case in that the user can read the E-mail with the terminal devices 101 and 102 while managing the E-mail only with the terminal device 103.

It is also possible to delete an E-mail in the memory 305 directly by an instruction from the user, regardless of contents in the process table 801.

The voice synthesizing part 308 executes voice synthesis so as to read a received E-mail aloud. The voice synthesizing part 308 converts a character code of the E-mail read from the memory 305 into a voice signal, and outputs contents of the E-mail as voice information through the speaker 309.

The timer 310 executes an automatic access to the provider server 104 regularly, namely, a so-called timer access. In other words, the timer 310 generates a trigger signal at a predetermined interval or at a predetermined time, and an interrupt instruction is given to the process controlling part 304. Then, the access program stored in the storage 305 starts, and the telephone 201 starts an access to the provider server 104. Thereafter, the E-mail 104b in the provider server 104 is down-loaded.

The radio communicating part 311 is capable of communicating with the sub-device 202 or the terminal devices 101, 102 and 103 by the radio signal through the antenna 312.

The button switch 313 includes a ten-key group used to input a calling number, and an alphabet key group or a kana key group used to input characters.

Figure 4:
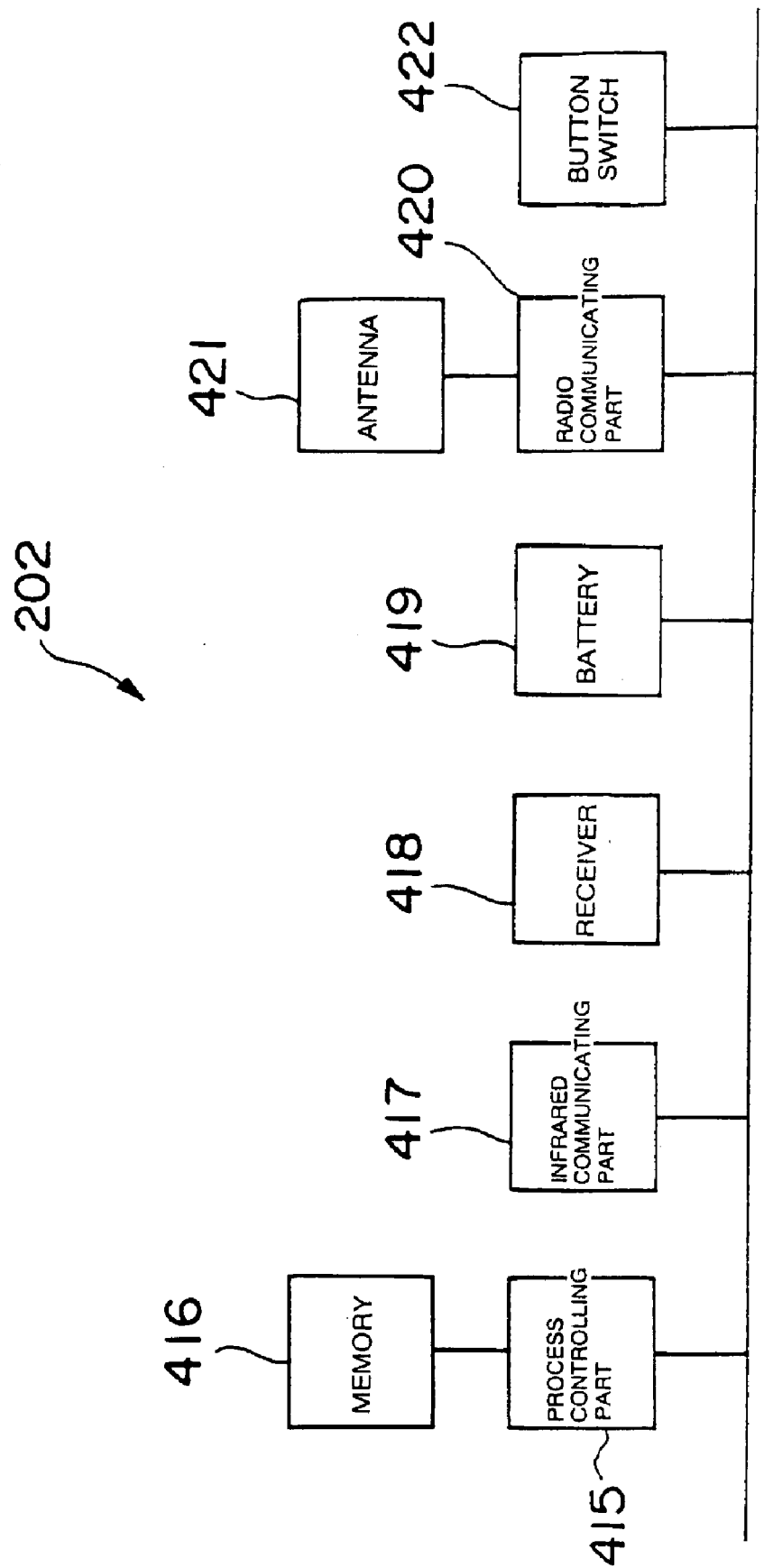
FIG. 4 is a block diagram showing a hardware configuration of a sub-device in an embodiment.

FIG. 4 is a block diagram showing an internal function structure of the sub-device 202 when the telephone is used as a main-device.

The sub-device 202, as shown in FIG. 4, is provided with a process controlling part 415, a memory 416, an infrared communicating part 417, a receiver 418, a battery 419, a radio communicating part 420, an antenna 412, and a button switch 422.

The process controlling part 415 is a CPU controlling the reception/transmission of the E-mail and controlling the memory 416.

The memory 416 is a nonvolatile memory, a dynamic RAM or the like. The memory 416 keeps a process program such as an access program to the provider server 104, E-mails down-loaded from the provider server 104, or the like. The memory 416 also keeps voice data such as a message. Further, in the memory 416, a status table shown in FIGS. 5 through 7 is set, similarly to the main-device.

Additionally, the sub-device 202 is capable of accessing the provider server 104 by radio communication through the telephone 201, which is the main-device. When the sub-device 202 accesses the provider server 104, the E-mail down-loaded from the provider server 104 may be stored in the memory 305 of the telephone 201 which is the main-device or may be stored in the memory 416 of the sub-device 202.

The infrared communicating part 417 is a port communicating with the external terminal device 103 or the like. The receiver 418 is provided with a mouthpiece and an earpiece.

The battery 419 supplies an actuation voltage to the sub-device 202, and is a dry battery or a charged battery.

The radio communicating part 420 is capable of communicating with the telephone 201 and the terminal devices 101, 102, 103 by a radio signal through the antenna 421.

The button switch 422 is provided with a ten-key group used to input a calling number, and an alphabet key group or a kana key group used to input characters.

Figure 9:
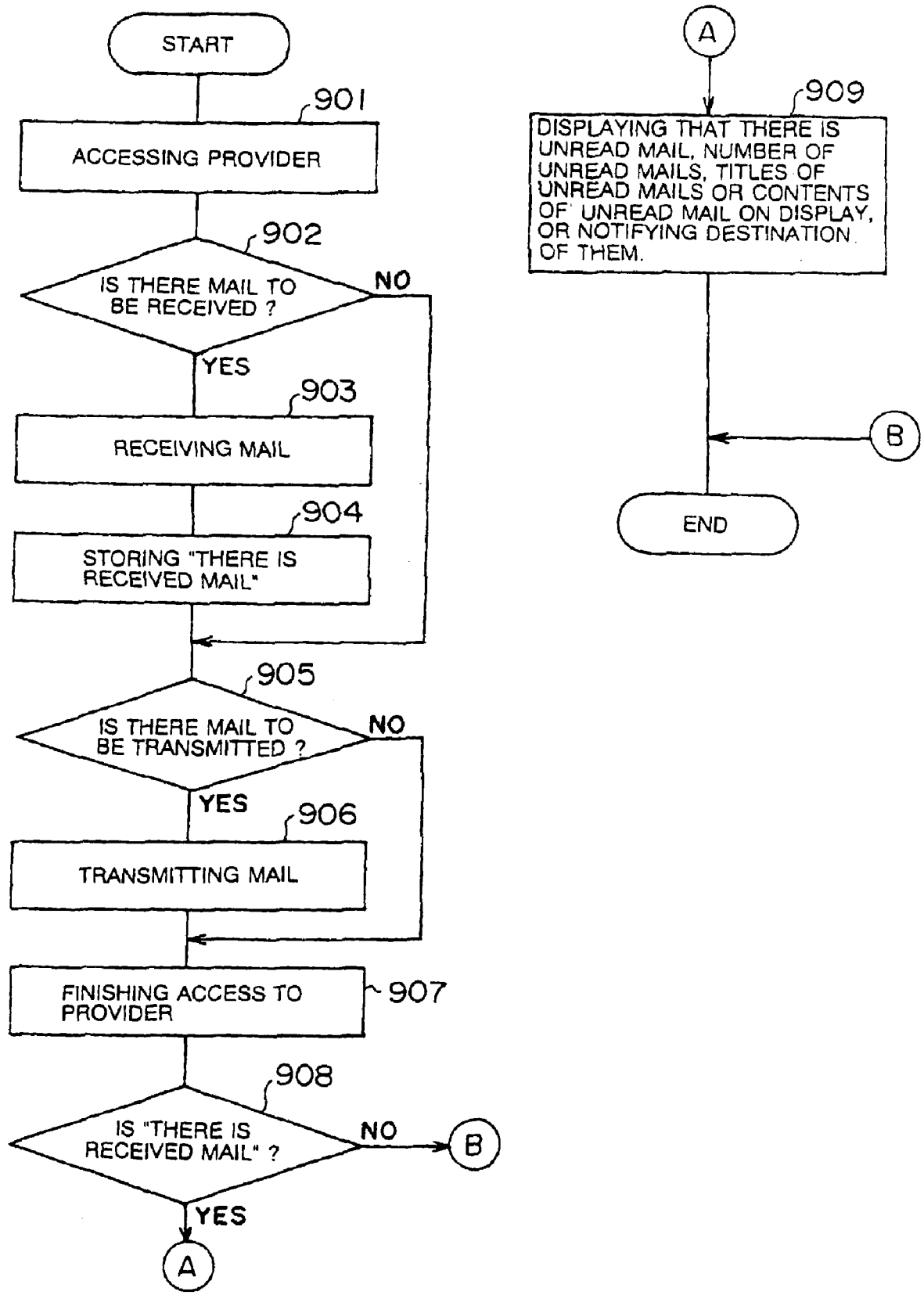
FIG. 9 is a flowchart showing a procedure in that a telephone accesses a provider server and deals with E-mail in an embodiment.
Figure 10:
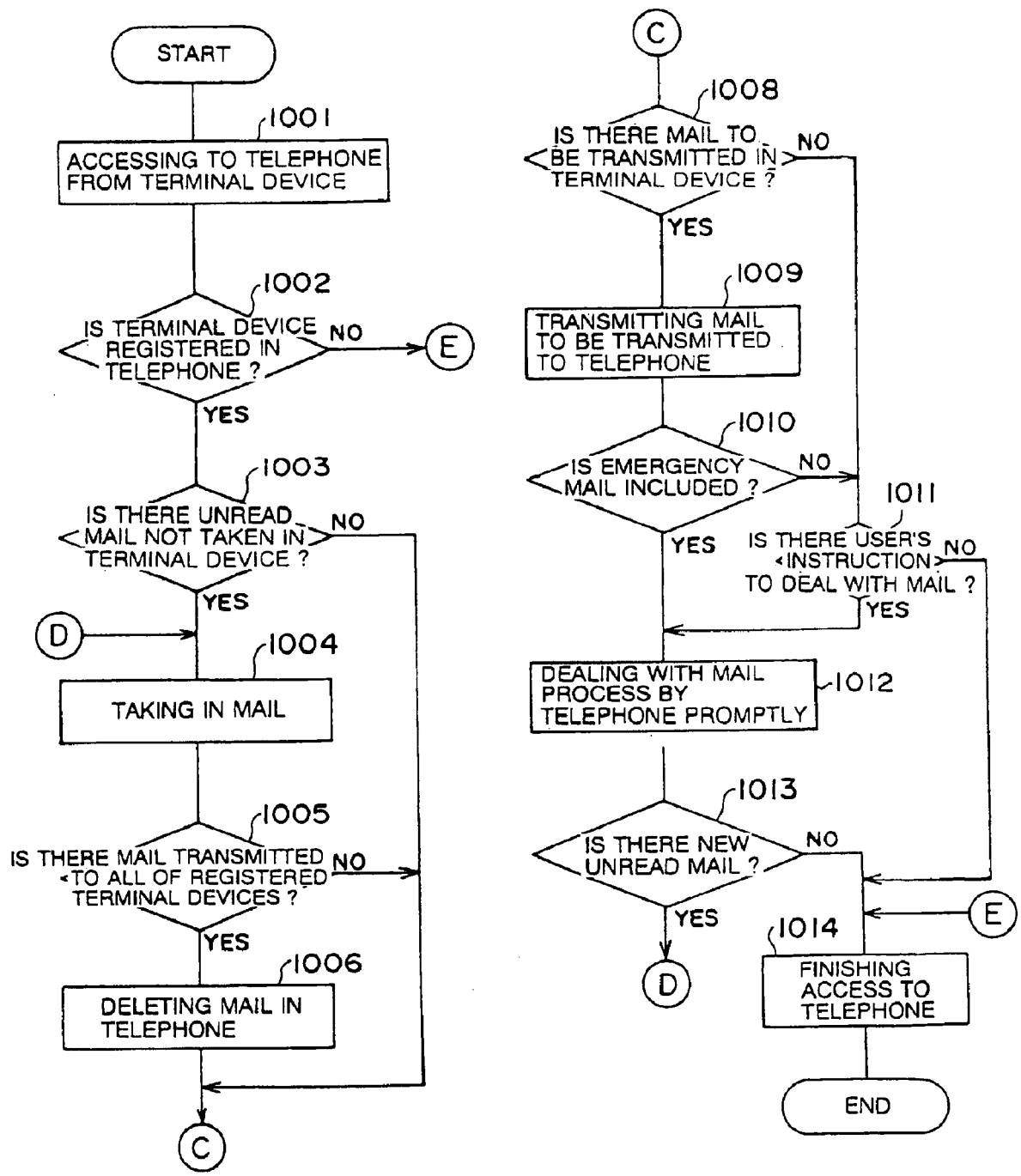
FIG. 10 is a flowchart showing a procedure in that an terminal device accesses a telephone and deals with E-mail in an embodiment.

Explanations will be given of the management procedure by the above-described system with reference to FIGS. 9 and 10.

In this embodiment, explanations will be given of a case in that E-mail data is communicated between the telephone 201 as a main device and the terminal device 103. Then, no explanation will be given of a case in that E-mail data is communicated between the sub-device 202 and the terminal device 103, since this case is similar to the above-mentioned case.

First, it is assumed that an E-mail 104b addressed to an user is received by the provider server 104.

The telephone 201 accesses to the provider server 104 through the telephone line 106, when it is time designated by an instruction from the timer (Step S901).

The telephone 201, when being connected with the provider server 104, checks whether or not a mail addressed to itself arrives at the provider server 104 (Step S902). When the E-mail 104b arrives at the provider server 104, the E-mail 104b in the provider server 104 is down-loaded (Step S903), and stored in the memory 305 (Step S904).

Then, the display 307 displays that the down-loaded E-mail 104b is stored in the memory 305, such as "there is a received mail". Further, the display 307 may display titles or contents of an unread mail (a mail downloaded to none of terminal devices) (Steps 908, 909). It is also possible to notify a destination shown in the memory 305 that there is an E-mail.

When an E-mail 104b is stored, a status table concerning this E-mail 104b is established as shown in FIGS. 5 through 7.

Then, the process controlling part 304 of the telephone 201 determines whether there is a transmission mail (a mail to be transmitted) in the memory 305 or not (Step 905). When there is a transmission mail in the memory 305, the process controlling part 304 transmits this transmission mail to the provider server 104 (Step 906) and finishes to access the provider server 104 (Step 907). The provider server 104 transmits this transmission mail to another server (not shown) based on TCP/IP (Transmission Control Protocol/Internet Protocol).

Next, an explanation will be given of a case in that the E-mail 104b stored in the memory 305 of the telephone 201 is used from an external terminal device.

First, the terminal device 101 calls the telephone 201 through the telephone line 106 (Step 1001). Then, the E-mail 104b in the memory 305 is read by the data communication function of the telephone 201, namely, by the control of the process controlling part 304, and this E-mail 104b is taken in the terminal device 101 through the telephone line 106. At this time, the process controlling part 304 compares an access ID transmitted from the terminal device 101 with an authorization ID stored in the memory 305 (Step 1002). Then, it is checked whether or not there is an E-mail unread by the terminal device 101 by referring the mail status table 501 (Step 1003).

In this embodiment, since there is an unread E-mail 104b, this E-mail 104b is taken in the terminal device 101 (Step 1004).

When the E-mail 104b in the telephone 201 is read by the terminal device in this way, the status table 501 is rewritten as shown in FIG. 5.

Then, it is judged whether or not there is an E-mail transmitted to all of the terminal devices registered in the status table 501 (Step 1005). When there is such a E-mail in the status table, this E-mail is deleted (Step 1006).

Continuously, it is judged whether or not there is a transmission mail in the terminal device 101 (Step 1008). When there is a transmission mail (a mail to be transmitted), this transmission mail is transmitted to the telephone 201 (Step 1009). The transmission mail from the terminal device 101 has an emergency flag at the header thereof. When the emergency flag stands, namely, the transmission mail is an emergency mail (Step 1010), the telephone 201 receiving this emergency mail deals with this emergency mail by giving priority (Step 1012). In other words, when an emergency mail is received, this emergency mail is stored in the memory 305 once, and the telephone 201 accesses the provider server 104 so as to execute a process transmitting this emergency mail to the provider server 104.

The telephone 201, when being instructed by the terminal device so as to deal with a mail though this mail is not an emergency mail (Step 1011), deals with this mail by giving priority.

The process controlling part 304 judges whether or not there is another unread mail (Step 1013). When there is another unread mail, the processes of the steps 1004 through 1014 are repeated. When there is no unread mail, the terminal device 101 finishes the access to the telephone 201 (Step 1014).

Next, an explanation will be given of a case in that the E-mail 104b in the telephone 201 is used with another terminal device 102 or 103.

First, the terminal device 102 or 103 (the electronic equipment 103 in FIG. 2) is arranged at a position facing to the infrared communication part 306, and the E-mail 104b in the memory 305 is down-loaded to the terminal device 102 or 103 by the infrared-ray communication. As the results, the status table 501 varies as shown in FIGS. 6 and 7. When the E-mail 104b is finally down-loaded by the terminal device 103, the process controlling part 304 refers to the process table 801, recognizes that the process mode of the terminal device 103 is "deletes", and deletes the E-mail 104b in the memory 305.

According to the present invention, though one person transmits and receives E-mails with plural terminal devices, it is possible to manage E-mails integratedly without imposing a burden on the provider server. Thus, it is possible to deal with E-mails effectively.

This invention being thus described, it will be obvious that the same may be varied in various ways. Such variations are not to be regarded as departure from the spirit and scope of the invention, and all such modifications would be obvious for one skilled in the art intended to be included within the scope of the following claims.

What is claimed is:

1. A telephone with an electronic mail managing function, said telephone capable of connecting with at least a mail server and a plurality of electronic devices, said telephone comprising:

an access unit accessing to the mail server;

a mail memory storing an electronic mail which is sent to one user downloaded from the mail server through the access unit;

a mail status memory storing each state of the electronic mail stored in the mail memory so as to correspond to each of the electronic devices, wherein each state stored in said status memory indicates whether or not the electronic mail is down-loaded to each of the electronic devices from the telephone; and a transmission unit transmitting the electronic mail stored in the mail memory to one of the plurality of electronic devices, wherein the electronic mail managing function is provided logically between the mail server and the plurality of electronic devices, and wherein the electronic mail managing function integratedly manages the electronic mail based on the state of the electronic mail corresponding to each of the electronic devices.

2. A telephone with an electronic mail managing function according to claim 1, said telephone further comprising:

a process table storing a process to be applied to the electronic mail after the electronic mail is down-loaded to each of the electronic devices from the telephone.

3. A telephone with an electronic mail managing function according to claim 2, said process to be applied to the electronic mail includes deleting the electronic mail and keeping the electronic mail.

4. A telephone with an electronic mail managing function according to claim 1, said telephone further comprising:

an emergency process unit judging whether or not a priority process is necessary based on the electronic mail received from each of the electronic devices and for executing an access to the mail server when the priority process is executed.

5. A telephone with an electronic mail managing function according to claim 1, said telephone further comprising:

an identifier memory storing an identifier of an electronic device to be connected, permits an access from the electronic device in case that the identifier coincides with the stored identifier.

6. A mail managing method in a mail managing apparatus capable of transmitting/receiving mail data to/from at least a mail server and a plurality of electronic devices, said method comprising:

a reading process of reading mail which is sent to one user stored in the mail server;

a storing process of storing the mail read in the reading process;

a display process of displaying a state of the mail stored in the storing process for each of the electronic devices, wherein said state includes whether or not the electronic mail is down-loaded to each of the electronic devices from a telephone; and a transmission process of transmitting the mail stored in the storing process to one of the electronic devices, wherein the mail managing apparatus is provided logically between the mail server and the plurality of electronic devices, and wherein the mail managing method integratedly manages the mail based on a state of the mail corresponding to each of the electronic devices.

7. A storage medium storing a program executed by a mail managing apparatus capable of transmitting/receiving mail data to/from at least a mail server and a plurality of electronic devices, said program when executed by the mail managing apparatus executing the processes comprising:

a reading process of reading a mail which is sent to one user stored in the mail server;

a storing process of storing the mail read in the reading process;

a display process of displaying a state of the mail stored in the storing process for each of the electronic devices, wherein said state includes whether or not the electronic mail is down-loaded to each of the electronic devices from a telephone; and a transmission process of transmitting the mail stored in the storing process to one of the electronic devices, wherein the mail managing apparatus is provided logically between the mail server and the plurality of electronic devices, and wherein the mail managing apparatus integratedly manages the mail server based on the state of the mail corresponding to each of the electronic devices.

8. An electronic mail managing apparatus capable of communicating with a mail server which stores therein an electronic mail sent to an address, comprising:

a receiving unit receiving from the mail server an electronic mail addressed to one predetermined address;

a mail memory unit storing the received electronic mail;

a mail status memory storing each state of the electronic mail stored in the mail memory unit so as to correspond to each of a plurality of the electronic devices, wherein the each state of the mail status memory unit indicates whether or not the electronic mail received by the electronic mail managing apparatus for each electronic device has been transmitted to the electronic device from a telephone, wherein the electronic mail managing apparatus is capable of communicating with the plurality of electronic devices; and a transmitting unit transmitting the electronic mail stored in the mail memory unit and received thereof from the mail server to one of the plurality of electronic devices in response to an access made by one of the plurality of electronic devices, wherein the electronic mail managing apparatus is provided logically between the mail server and the plurality of electronic devices, and wherein the electronic mail managing apparatus integratedly manages the electronic mail based on the electronic mail state corresponding to each of the electronic devices.

9. An electronic mail managing apparatus according to claim 8 further comprising:

a process specifying unit for specifying, for each electronic device, how the electronic mail transmitted to the electronic device should be processed.

10. An electronic mail managing apparatus according to claim 9 further comprising:

a unit for receiving the electronic mail from each electronic device; and a unit for transmitting the received electronic mail to the mail server.

11. An electronic mail managing apparatus according to claim 10, wherein said electronic managing apparatus is emergency processing unit for judging whether or not a preference process is necessary based on the received electronic mail and, if judged to be affirmative, executing access to the mail server.

12. An electronic mail managing apparatus according to claim 11 further comprising:

an identifier memory storing therein identifiers of the plurality of electronic devices, and permitting access from the electronic device corresponding to the stored identifier.

13. An electronic mail managing apparatus according to claim 8 wherein the electronic mail managing apparatus is provided in a telephone.

14. An electronic mail managing method in an electronic mail managing apparatus capable of communicating with a mail server which stores therein an electronic mail sent to an address, comprising:

receiving from the mail server an electronic mail addressed to one predetermined address;

storing the received electronic mail in a memory unit;

storing in a status memory unit each state of the electronic mail stored in the mail memory unit so as to correspond to each of a plurality of the electronic devices, wherein each state of the status memory unit indicates whether or not the electronic mail received by the electronic mail managing apparatus for each electronic devices has been transmitted to the associated electronic device from a telephone; and wherein the electronic mail managing apparatus is capable of communicating with the plurality of electronic device, and transmitting the electronic mail stored in the mail memory unit and received thereof from the mail server to one of the plurality of electronic devices in response to an access made by said electronic device, wherein the electronic mail managing apparatus is provided logically between the mail server and the plurality of electronic devices, and wherein the electronic mail managing method integratedly manages the electronic mail based on the electronic mail state corresponding to each of the electronic devices.

15. An electronic mail managing method according to claim 14 further comprising:

processing the received electronic mail based on a process specifying information specifying for each electronic device how the electronic mail transmitted to the respective electronic devices should be processed.

16. An electronic mail managing method according to claim 14 further comprising:

receiving the electronic mail from each electronic device; and transmitting the received electronic mail to the mail server.

17. An electronic mail managing method according to claim 16 further comprising:
  judging whether or not a preference process is necessary based on the received electronic mail; and
  executing access to the mail server, if judged to be affirmative.

18. An electronic mail managing method according to claim 14 further comprising:
  permitting access from the terminal device corresponding to a stored identifier, based on the information of an identifier memory unit which stores therein identifiers of the plurality of electronic devices.

19. A storage medium storing a program executing electronic mail management in an information processing apparatus capable of communicating with a plurality of electronic devices, the program when executed by the information processing apparatus executing the functions comprising:
  receiving an electronic mail sent to one predetermined address from a mail server which stores therein the electronic mail addressed to an address;
  storing the received electronic mail in a memory unit;
  storing in a status memory unit each state of the electronic mail stored in the mail memory unit so as to correspond to each of the plurality of the electronic devices, wherein each state indicates whether or not the electronic mail received by the electronic mail management for each electronic devices has been transmitted to the associated electronic device from a telephone; and
  transmitting the electronic mail stored in the memory unit and received thereof from the mail server to one of the plurality of electronic devices in response to an access made by said one of the plurality of electronic devices, wherein the electronic mail management is provided logically between the mail server and the plurality of electronic devices and wherein the electronic mail management integratedly manages the electronic mail based on the electronic mail state corresponding to each of the electronic devices.

20. A program of the storage medium according to claim 19 further comprising:
  processing the received electronic mail based on a process specifying information specifying for each electronic device how the electronic mail transmitted to the electronic device should be processed.

21. A program of the storage medium according to claim 19 further comprising:
  receiving the electronic mail from each electronic device; and
  transmitting the received electronic mail to the mail server.

22. A program of the storage medium according to claim 21 further comprising:
  judging whether or not a preference process is necessary based on the received electronic mail; and
  executing access to the mail server, if judged to be affirmative.

23. A program of the storage medium according to claim 19 further comprising:
  permitting access from the electronic device corresponding to a stored identifier, based on the information of an identifier memory unit which stores therein identifiers of the plurality of electronic devices.

24. An electronic mail managing system comprising:
  an electronic mail managing apparatus capable of communicating with a mail server which stores therein an electronic mail sent to an address; and
  a plurality of electronic devices capable of communicating with the electronic mail managing apparatus; and
  wherein the electronic mail managing apparatus comprising:
  a receiving unit receiving from the mail server an electronic mail addressed to one predetermined address;
  a mail memory unit storing therein the received electronic mail;
  a mail status memory storing each state of the electronic mail stored in the mail memory unit so as to correspond to each of the plurality of the electronic devices, wherein each state of the mail status memory unit indicates whether or not the electronic mail received by the electronic mail managing apparatus for each electronic device has been transmitted to the associated electronic device from the mail managing apparatus; and
  a transmitting unit transmitting the electronic mail stored in the mail memory unit and received thereof from the mail server to one of the plurality of electronic devices in response to an access made by said electronic device, wherein the electronic mail managing apparatus is provided logically between the mail server and the plurality of electronic devices and wherein the electronic mail management apparatus integratedly manages the electronic mail based on the electronic mail state corresponding to each of the electronic devices.

25. An electronic mail managing system according to claim 24, wherein the electronic mail managing apparatus further comprising:
  a process specifying unit specifying, for each electronic device, how the electronic mail transmitted to the respective electronic devices should be processed.

26. An electronic mail managing system according to claim 24, wherein the electronic mail managing apparatus further comprising:
  a unit for receiving the electronic mail from each electronic device; and
  a unit for transmitting the received electronic mail to the mail server.

27. An electronic mail managing system according to claim 24, wherein the electronic managing apparatus further comprising:
  an emergency processing unit for judging whether or not a preference process is necessary based on the received electronic mail and, if judged to be affirmative, executing access to the mail server.

28. An electronic mail managing system according to claim 24, wherein the electronic mail managing apparatus further comprising:
  an identifier memory storing therein identifiers of the plurality of electronic devices, and permitting access from the electronic device corresponding to the stored identifier.

29. An electronic mail managing system according to claim 24, wherein the electronic mail managing apparatus is a telephone.

* * * * *

UNITED STATES PATENT AND TRADEMARK OFFICE
CERTIFICATE OF CORRECTION

PATENT NO. : 6,917,670 B2
APPLICATION NO. : 09/141318
DATED : July 12, 2005
INVENTOR(S) : Hiroshi Isomura It is certified that error appears in the above-identified patent and that said Letters Patent is hereby corrected as shown below:

On the Title Page, Column 2, Foreign Patent Documents, line 9, replace "11320862" with --11328062--. therefor;

Column 8, line 23, claim 1, replace "one" with --a--, therefor

Column 8, line 23, claim 1, after "user" insert --to be accessed via at leat one of the plurality of electronic devices and--;

Column 8, line 28, claim 1, after "said" insert --mail--;

Column 8, line 29, claim 1, replace "to each of" with --and to which--, therefor;

Column 8, line 66, claim 6, replace "one" with --a--, therefor;

Column 8, line 66, claim 6, after "user" insert --to be accessed via at least one of the plurality of electronic devices and--;

Column 9, line 6, claim 6, replace "to each of" with --and to which--, therefor;

Column 9, line 21, claim 7, replace "one" with --a--, therefor;

Column 9, line 22, claim 7, after "user" insert --to be accessed via at leat one of the plurality of electronic devices and--;

Column 9, line 28, claim 7, replace "to each of" with --and to which--, therefor;

Column 9, line 44, claim 8, after "mail" insert --which is sent to the one predetermined address to be accessed via at least one of the plurality of electronic devices;--;

Column 9, line 51, claim 8, replace "to the" with --and to which the--, therefor;

Column 10, line 33, claim 14, after "mail" insert --which is sent to the one predetermined address to be accessed via at least one of the plurality of electronic devices;--;

Column 10, line 40, claim 14, replace "to the" with --and to which the--, therefor;

Column 11, line 9, claim 18, replace "terminal" with --electronic--, therefor;

Column 11, line 20, claim 19, after "address" insert -- to be accessed via at least one of the plurality of electronic devices--;

UNITED STATES PATENT AND TRADEMARK OFFICE
CERTIFICATE OF CORRECTION

PATENT NO. : 6,917,670 B2
APPLICATION NO. : 09/141318
DATED : July 12, 2005
INVENTOR(S) : Hiroshi Isomura It is certified that error appears in the above-identified patent and that said Letters Patent is hereby corrected as shown below:

Column 11, line 29, claim 19, replace "to each of" with --and to which--, therefor;

Column 12, line 12, claim 24, after "mail" insert -- that is sent to the one predetermined address to be accessed via at least one of the plurality of electronic devices--;

Column 12, line 19, claim 24, replace "to the" with --and to which the--, therefor.

Signed and Sealed this

Fourteenth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 6,917,670 B2
APPLICATION NO. : 09/141318
DATED : July 12, 2005
INVENTOR(S) : Hiroshi Isomura It is certified that error appears in the above-identified patent and that said Letters Patent is hereby corrected as shown below:

On the Title Page, Column 2, Foreign Patent Documents, line 9, replace "11320862" with --11328062--. therefor;

Column 8, line 23, claim 1, replace "one" with --a--, therefor

Column 8, line 23, claim 1, after "user" insert --to be accessed via at least one of the plurality of electronic devices and--;

Column 8, line 28, claim 1, after "said" insert --mail--;

Column 8, line 29, claim 1, replace "to each of" with --and to which of--, therefor;

Column 8, line 66, claim 6, replace "one" with --a--, therefor;

Column 8, line 66, claim 6, after "user" insert --to be accessed via at least one of the plurality of electronic devices and--;

Column 9, line 6, claim 6, replace "to each of" with --and to which of--, therefor;

Column 9, line 21, claim 7, replace "one" with --a--, therefor;

Column 9, line 22, claim 7, after "user" insert --to be accessed via at least one of the plurality of electronic devices and--;

Column 9, line 28, claim 7, replace "to each of" with --and to which of--, therefor;

Column 9, line 44, claim 8, after "mail" insert --which is sent to the one predetermined address to be accessed via at least one of the plurality of electronic devices--;

Column 9, line 51, claim 8, replace "to the" with --and to which the--, therefor;

Column 10, line 33, claim 14, after "mail" insert --which is sent to the one predetermined address to be accessed via at least one of the plurality of electronic devices--;

Column 10, line 40, claim 14, replace "to the" with --and to which of the--, therefor;

Column 11, line 9, claim 18, replace "terminal" with --electronic--, therefor;

Column 11, line 20, claim 19, after "address" insert -- to be accessed via at least one of the plurality of electronic devices--;

UNITED STATES PATENT AND TRADEMARK OFFICE
CERTIFICATE OF CORRECTION

PATENT NO. : 6,917,670 B2
APPLICATION NO. : 09/141318
DATED : July 12, 2005
INVENTOR(S) : Hiroshi Isomura It is certified that error appears in the above-identified patent and that said Letters Patent is hereby corrected as shown below:

Column 11, line 29, claim 19, replace "to the" with --and to which of the--, therefor;

Column 12, line 12, claim 24, after "mail" insert -- that is sent to the one predetermined address to be accessed via at least one of the plurality of electronic devices--;

Column 12, line 19, claim 24, replace "to the" with --and to which of the--, therefor.

This certificate supersedes the Certificate of Correction issued August 14, 2007.

Signed and Sealed this

Twenty-ninth Day of April, 2008

JON W. DUDAS
*Director of the United States Patent and Trademark Office*